US 6,632,768 B2

(12) United States Patent
Loyalka et al.

(10) Patent No.: US 6,632,768 B2
(45) Date of Patent: Oct. 14, 2003

(54) ADSORBENT FOR HC IN EXHAUST GAS, AND PROCESS FOR PRODUCING THE SAME

(75) Inventors: Sudarshan Loyalka, Columbia, MO (US); Tushar Ghosh, Columbia, MO (US); Robert V. Tompson, Jr., Columbia, MO (US); George Vosnidis, Schenectady, NY (US); Gregory A. Holscher, Olathe, KS (US); Hiroshi Ogasa, Wako (JP); Tetsuo Endo, Wako (JP)

(73) Assignees: University of Missouri-Columbia, Columbia, MO (US); Honda Giken Kogyo Kabushiki Kaisha, Tokyo (JP)

( * ) Notice: Subject to any disclaimer, the term of this patent is extended or adjusted under 35 U.S.C. 154(b) by 83 days.

(21) Appl. No.: 09/803,135

(22) Filed: Mar. 12, 2001

(65) Prior Publication Data

US 2002/0160905 A1 Oct. 31, 2002

(51) Int. Cl.$^7$ ................................. B01J 29/06
(52) U.S. Cl. ............................ 502/64; 502/60; 502/63; 502/71; 502/77; 502/79; 502/78
(58) Field of Search ............................ 502/60, 64, 63, 502/71, 77, 78, 79

(56) References Cited

U.S. PATENT DOCUMENTS

| | | | | |
|---|---|---|---|---|
| 4,090,981 A | * | 5/1978 | Rodewald | 502/69 |
| 5,120,692 A | * | 6/1992 | Beck | 502/60 |
| 5,173,461 A | * | 12/1992 | Absil et al. | 502/62 |
| 5,385,753 A | * | 1/1995 | Hu et al. | 427/215 |
| 5,851,378 A | * | 12/1998 | Vogt et al. | 208/108 |
| 6,066,770 A | * | 5/2000 | Wu et al. | 585/475 |
| 6,200,464 B1 | * | 3/2001 | van Houtert et al. | 208/119 |
| 2002/0082460 A1 | * | 6/2002 | Verduijn et al. | 585/475 |

* cited by examiner

Primary Examiner—Tom Dunn
Assistant Examiner—Christina Ildebrando
(74) Attorney, Agent, or Firm—Arent Fox Kintner Plotkin & Kahn, PLLC

(57) ABSTRACT

An adsorbent for HC in an exhaust gas is an agglomerate of double-structure particles, each of which includes an HC-adsorbing zeolite core, and a ceramic coat wrapping the zeolite core and having a plurality of through-pores communicating with a plurality of pores in the zeolite core. Each of the double-structure particles is at least one of a double-structure particle including the zeolite core comprising a single zeolite particle, and a double-structure particle including the zeolite core comprising a plurality of zeolite particles. Each of the through-pores in the ceramic coat has such a shape that the HC is easy to flow into the through-pore and difficult to flow out of the through-pore.

6 Claims, 19 Drawing Sheets

ADSORBENT FOR HC IN EXHAUST GAS, AND PROCESS FOR PRODUCING THE SAME

BACKGROUND OF THE INVENTION

1. Field of the Invention

The present invention relates to an adsorbent for hydrocarbons (which will be referred to as HC hereinafter) in an exhaust gas, and particularly, to an HC adsorbent made using zeolite and a process for producing the same.

2. Description of the Related Art

There is a conventionally known exhaust emission control device disposed in an exhaust system in a motor vehicle, e.g., an exhaust emission control device using a mixture of an HC adsorbent and a catalyst, and an exhaust emission control device using an HC adsorbent layer and a catalyst layer laminated one on another. In this case, zeolite is used as the HC adsorbent. Such exhaust emission control device is aimed at adsorbing by a zeolite HC that is contained at a high concentration in a low-temperature exhaust gas discharged immediately after starting of an engine, and desorbing HC from the zeolite in accordance with a rise in temperature of the exhaust gas to convert HC by the catalyst which is in an activated state.

To reliably achieve this aim, it is required that the temperature of desorption of HC from the zeolite be equal to or higher than a catalyst activating temperature. However, the following problem is encountered: The temperature of desorption of HC from zeolite commonly used at the present time is lower than the catalyst activating temperature and as a result, HC adsorbed cannot be converted sufficiently.

SUMMARY OF THE INVENTION

Accordingly, it is an objective of the present invention to provide an HC adsorbent of the above-described type, wherein HC desorbed from zeolite can be inhibited from flowing back into an exhaust gas, thereby providing an effect similar to that to be obtained in a case where the temperature of desorption of HC from the zeolite is higher.

To achieve the above objective, according to the present invention, there is provided an adsorbent for hydrocarbons (HC) in an exhaust gas, comprising an agglomerate of double-structure particles, each of which includes an HC-adsorbing zeolite core, and a ceramic coat wrapping the zeolite core and having a plurality of through-pores communicating with a plurality of pores in the zeolite core, wherein each of the double-structure particles is at least one of a double-structure particle including the zeolite core comprising a single zeolite particle, and a double-structure particle including the zeolite core comprising a plurality of zeolite particles, and each of the plurality of through-pores in the ceramic coat has such a shape that the HC is easy to flow into the through-pore and difficult to flow out of the through-pore.

When the adsorbent is formed as described above, HC contained at a high concentration in a low-temperature exhaust gas discharged immediately after starting of an engine is passed through the plurality of through-pores in the ceramic core and adsorbed in the plurality of pores in the zeolite coat. The HC is desorbed out of the pores in the zeolite core with rising of the temperature of the exhaust gas, but the desorbed HC is inhibited from flowing back into the exhaust gas by the ceramic coat. Therefore, the temperature at the end of the flowing-out of the HC is shifted to a level about 70° C. higher than that in an adsorbent having no ceramic coat. Thus, the HC conversion rate can be increased largely.

Another objective of the present invention is to provide a process for producing an HC adsorbent of the above-described type, wherein the HC adsorbent can be produced easily.

To achieve the above objective, according to the present invention, there is provided a process for producing an adsorbent for hydrocarbons (HC) in an exhaust gas, the adsorbent comprising an agglomerate of double-structure particles, each of which includes an HC-adsorbing zeolite core, and a ceramic coat wrapping the zeolite core and having a plurality of through-pores, the process comprising the steps of:

preparing a liquid mixture of an agglomerate of zeolite particles and a ceramic coat-forming precursor solution, thereby forming at least one of a plurality of liquid drops each comprising a single of the zeolite particle wrapped with the precursor solution and a plurality of liquid drops each comprising a plurality of the zeolite particles wrapped with the precursor solution, precipitating the precursor by drying the liquid drops, and trapping at least one of a liquid and vapor into pores in the zeolite particles, forming a ceramic layer by pyrolysis of the precursor, and creating the through-pores by escaping of the trapped vapor through the ceramic layer, wherein the steps are carried out in the mentioned order.

If the above procedure is employed, the HC adsorbent can be produced easily and reliably.

The above and other objects, features and advantages of the invention will become apparent from the following description of the preferred embodiment taken in conjunction with the accompanying drawings.

DESCRIPTION OF THE PREFERRED EMBODIMENTS

Figure 1:
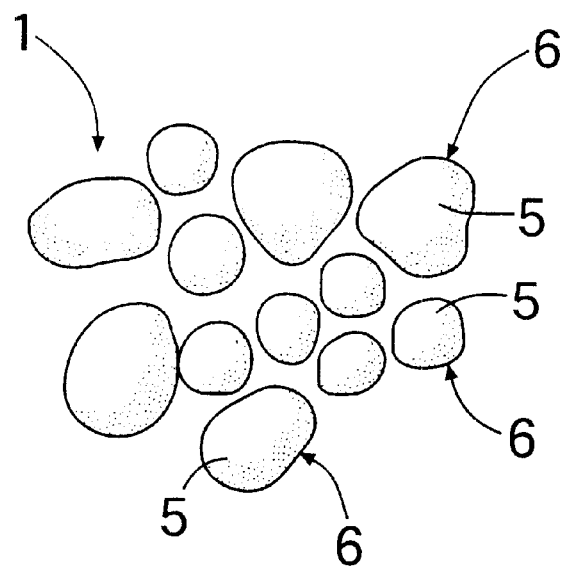
FIG. 1 is a perspective view of an HC adsorbent.

As shown in FIGS. 1 to 4, an adsorbent 1 for hydrocarbons in an exhaust gas is an agglomerate of double-structure particles 6, each of which includes an HC-adsorbing zeolite core 2, and a ceramic coat 5 enwrapping the zeolite core 2 and having a plurality of through-pores 4 communicating with a plurality of pores 3 in the zeolite core 2.

Figure 2:
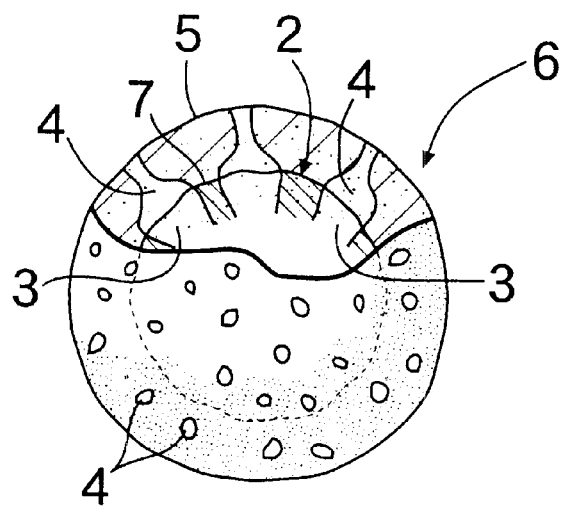
FIG. 2 is a sectional view of an essential portion of one example of a double-structure particle.
Figure 3:
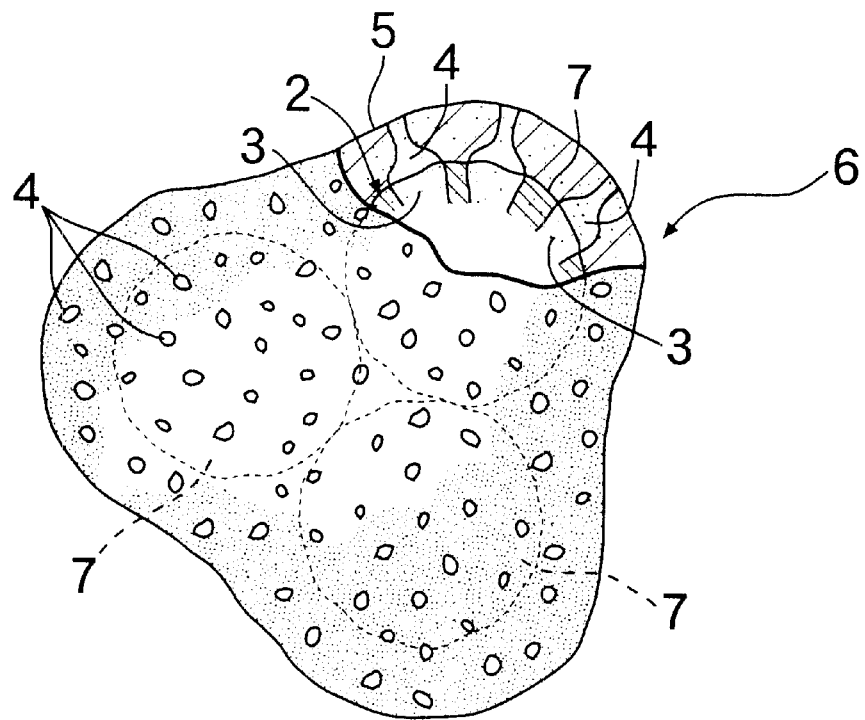
FIG. 3 is a sectional view of an essential portion of another example of a double-structure particle.

Each of the double-structure particles 6 is at least one of a double-structure particle including a zeolite core 2 comprising a single zeolite particle 7, as best shown in FIG. 2, and a double-structure particle including a zeolite core 2 comprising a plurality of zeolite particles 7, as best shown in FIG. 3.

The zeolite particle 7 has a diameter d1 set in a range of $5 \, \mu m \leq d1 \leq 20 \, \mu m$, and the zeolite particle 7 which may be used is at least one particle selected from the group consisting of a ferrierite particle, a ZSM-5 particle, a Y-type particle, a mordenite particle and a β-type particle.

Figure 4:
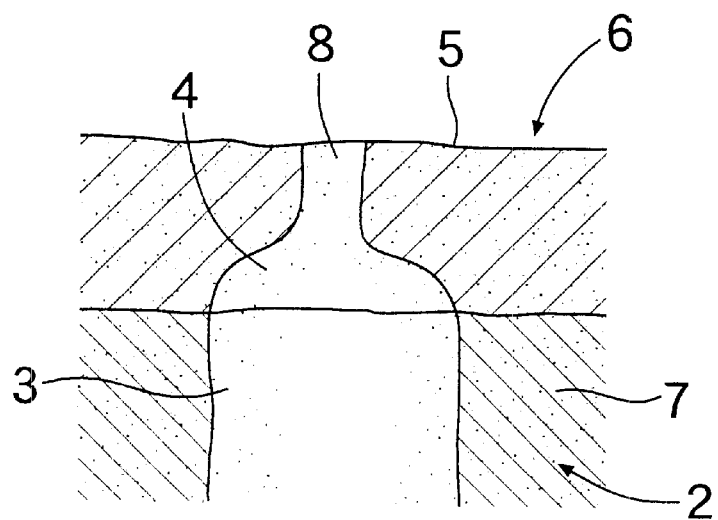
FIG. 4 is a partially sectional view of the double-structure particle.

Each of the through-pores 4 in the ceramic coat 5 has such a shape that HC is easy to flow into the through-pore 4 and difficult to flow out of the through-pore 4. In the illustrated embodiment, each of the through-pores 4 in the ceramic coat 5 has a bottleneck shape with an opening 8 narrowed down, as best shown in FIG. 4. The opening 8 has an average diameter d2 set in a range of $0.2 \, nm \leq d2 \leq 0.8 \, nm$ from the relationship to the size of HC. However, if the average diameter d2 of the opening 8 is smaller than 0.2 nm, the passing of HC at an adsorbing stage is obstructed. On the other hand, if the average diameter d2 of the opening 8 is larger than 0.8 nm, an effect of inhibiting the flowing-out of the desorbed HC is reduced. The ceramic coat 5 may be formed into a plurality of layers in order to provide the through-pores each having a shape as described above. A material for forming the ceramic coat 5 is at least one compound selected from $Al_2O_3$, $SiO_2$, $Y_2O_3$ and the like.

If the adsorbent is formed as described above, HC contained at a high concentration in an low-temperature exhaust gas discharged immediately after starting of an engine is permitted to flow via the plurality of through-pores 4 in the ceramic coat 5, and adsorbed in the plurality of pores 3 in the zeolite core 2. The HC is desorbed out of the pores 3 in the zeolite core 2 with rising of the temperature of the exhaust gas, but the desorbed HC is inhibited from flowing back into the exhaust gas by a constricting effect of the through-pores 4 in the ceramic coat 5. Therefore, the temperature at the end of flowing-out of HC is displaced to a level about 70° C. higher than that in an adsorbent having no ceramic coat. Thus, the HC conversion rate can be increased largely.

Examples of processes for producing the HC adsorbent 1 are a flame synthesis method and a spray pyrolysis method.

A starting material used in these methods is a liquid mixture of an agglomerate of zeolite particles 7 and a ceramic coat-forming precursor solution (aqueous solution in this embodiment).

When the ceramic coat 5 is formed from $Al_2O_3$, $Al(NO_3)_3 \cdot 9H_2O$ is used as the precursor. When the ceramic coat 5 is formed from $Y_2O_3$, $Y(NO_3)_3 \cdot 6H_2O$ is used as the precursor. Further, when the ceramic coat 5 is formed from $SiO_2$, $Si(OC_2H_5)_4$ (TEOS: tetraethyl orthosilicate) is used as the precursor.

[I] Flame Synthesis Method

Figure 5:
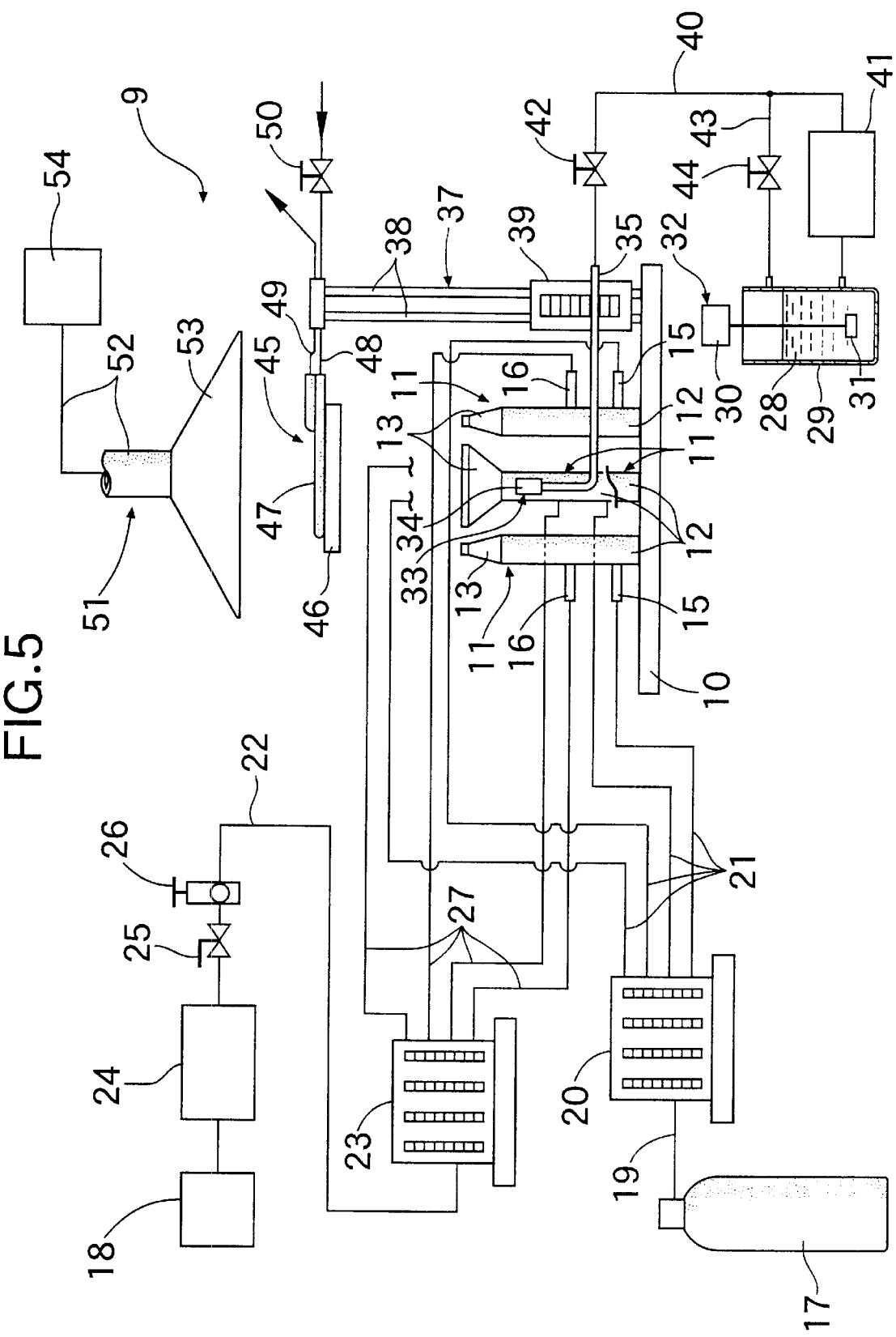
FIG. 5 is a front view of a flame synthesis system.
Figure 6:
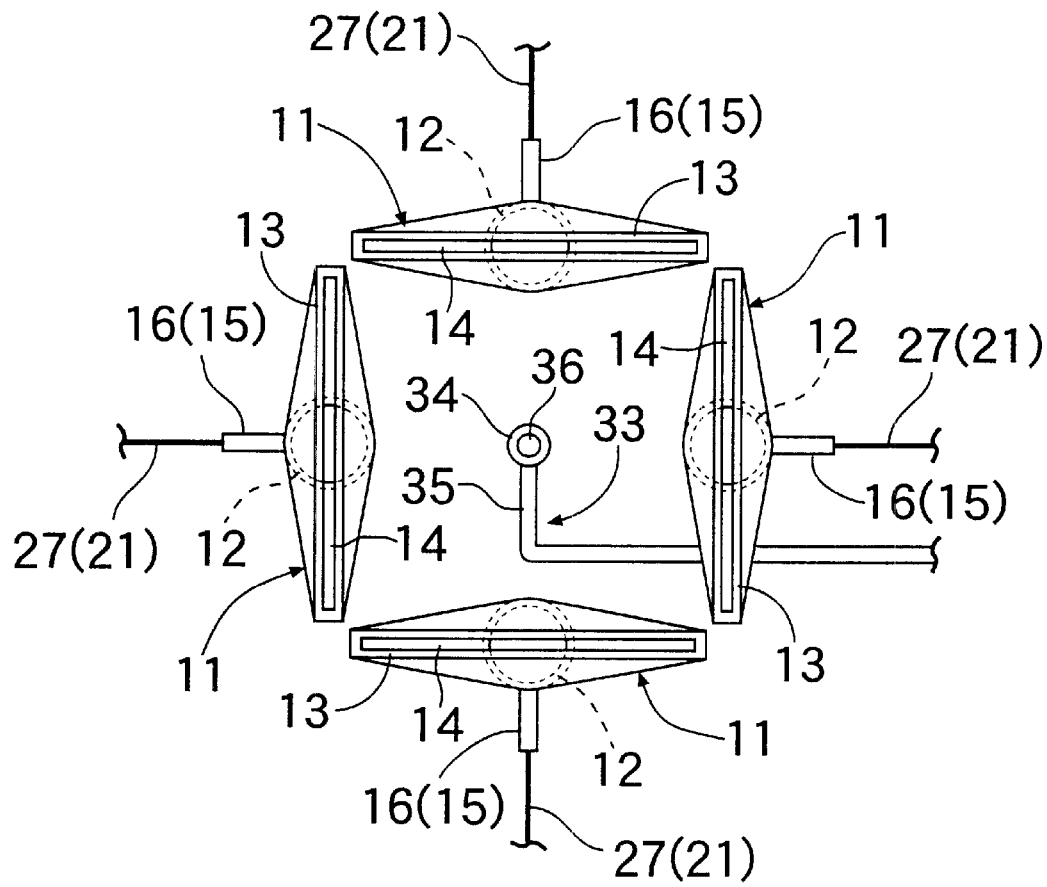
FIG. 6 is a plan view of Fisher® blast burners.

FIG. 5 shows a flame synthesis system 9. The system 9 includes a base 10 made of a zinc-aluminum alloy, and four Fisher® blast burners 11 are mounted to rise on an upper surface of the base 10. Each of the burners 11 is disposed to lie on each of sides of a phantom square, as best shown in FIG. 6. Each of the burners 11 is formed of a rustproof chromium-plated brass, and comprises a tubular member 12 having a circular section, and a substantially trapezoidal spray nozzle 13 mounted at a tip end of the tubular member 12 with a longer one of two parallel sides located on an upper side. Each of the spray nozzles 13 has a narrow rectangular ejection port 14, and thus, it is possible to equally spread flame, to provide intensive heat and further to prevent a flashback (back fire).

Each of the tubular members 12 has a first introducing portion 15 for receiving methane which is a fuel at its lower portion, and a second introducing portion 16 for receiving air at its upper portion. A methane tank 17 is connected to each of the first introducing portions 15, and an air-introducing compressor 18 is connected to each of the second introducing portions 16. The methane tank 17 is connected to a methane rotameter 20 through a pipeline 19, and four pipelines 21 extending from the rotameter 20 are connected to the four first introducing portions 15, respectively. The compressor 18 is connected to an air rotameter 23 through a pipeline 22, and a dryer system 24 including a drying agent and front and rear special filters, a ball valve 25 and a pressure regulator 26 are disposed in the pipeline 22 sequentially in the named order from the side of the compressor 18. Four pipelines 27 extending from the rotameter 23 are connected to the four second introducing portions 16, respectively.

The liquid mixture 28 of the agglomerate of zeolite particles and the aqueous precursor solution for forming the ceramic coat is placed in a cylindrical reservoir 29 made of PVC (polyvinyl chloride). An electrically powered stirring device 32 including a motor 30 and a stirrer 31 is mounted at the reservoir 29, so that the settling of the zeolite particles 7 is prevented by the stirring device 32.

A mini-mist nozzle assembly 33 includes a mini-mist nozzle 34, and a pipe 35 made of a stainless steel and connected to the mini-mist nozzle 34. As best shown in FIG. 6, the mini-mist nozzle 34 is disposed on an axis of a space surrounded by the four Fisher® blast burners with its ejection port 36 turned upwards, and the pipe 35 is connected to a vertical translation device 37 disposed on the upper surface of the base 10. The device 37 includes a pair of guide posts 38 rising on the upper surface of the base 10, and a slider 39 which is liftably and lowerably mounted on the guide posts 38 and capable of being stopped at any position, and the pipe 35 is fixed to the slider 39. The position of the slider 39 is represented by mm.

A portion of the reservoir 29 nearer to its bottom and the pipe 35 of the mini-mist assembly 33 are connected to each other by a pipeline 40 made of PTFE (polytetrafluoroethylene), and a centrifugal pump 41 and a Swagelock® needle valve 42 are disposed in the pipeline 40 in the named order from the side of the reservoir 29. In a pipeline 46, the centrifugal pump 41 and the Swagelock® needle valve 42 are connected to the reservoir 29 at a location nearer to an opening thereof through a pipeline 43 made of PTFE, and a Swagelock® needle valve 44 is disposed in the pipeline 43.

Figure 7:
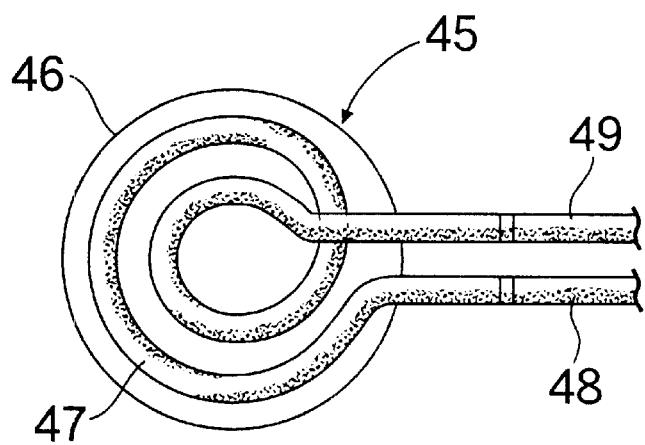
FIG. 7 is a plan view of an essential portion of a particle collector.

As also shown in FIG. 7, a particle collector 45 includes a disk 46 made of a stainless steel and disposed above the four Fisher® blast burners 11, a cooling tube 47 made of a stainless steel, which is helical in a plane and bonded to an upper surface of the disk 46, a water supply pipe 48 and a water discharge pipe 49 which are connected to opposite ends of the cooling tube 47 and retained at upper ends of the guide posts 38 of the vertical translation device 37, and a Swagelock® needle valve 50 disposed in the water supply pipe 48.

A forced air discharge device 51 is disposed above the particle collector 45. The device 51 comprises a duct 52, which is made of an aluminum and circular in section, a hood 53 made of aluminum, which is mounted at one end of the duct 52 and has a square suction port, and a blower 54 mounted at the other end of the duct 52.

The HC adsorbent 1 is produced using the above-described flame synthesis system 9 via a process which will be described below.

The mixture of the agglomerate of zeolite particles 7 and the aqueous precursor solution for forming ceramic coat are placed into the reservoir 29 and stirred sufficiently by the electrically powered stirring device 32. This stirring is continued throughout the producing course.

The ball valve 25 is opened, and the compressor 18 is operated to supply the air to each of the Fisher® blast burners 11. Moisture, particles, an oil and the like contained in the air are removed by the drying system 24. The flow rate of the air is controlled by the pressure regulator 26, and further, the flow rate of the air into each of the Fisher® blast burners 11 is measured by the rotameter 23.

A cock of the methane tank 17 is opened to supply methane to each of the Fisher® blast burners 11. The flow rate of methane to each of the Fisher® blast burners 11 is measured by the rotameter 20.

In each of the Fisher® blast burners 11, the air and the methane are mixed together and then, the mixed gas is fired to generate a single cylindrical flame comprising four band-shaped flame portions.

The mini-mist nozzle 34 is moved to an optimal ejecting position within the cylindrical flame by the vertical translation device 37.

The centrifugal pump 41 is operated to supply the liquid mixture 28 in an amount controlled by the two Swagelock® needle valves 42 and 44 to the mini-mist nozzle 34. The liquid mixture 28 is sprayed from the ejection port 36 in the mini-mist nozzle 34 to fly within the cylindrical flame, and during this time, an HC adsorbent 1, namely, double-structure particles 6, are formed. The particles 6 are deposited to the disk 46 and the cooling tube 47, where they are cooled.

The amount of cooling water supplied to the cooling tube 47 is controlled by the Swagelock® needle valve 50. The double-structure particles 6 deposited to the disk 46 and the like are removed from the disk 46 and the like and collected after lapse of about 5 minutes from the start of the spraying of the liquid mixture 28. Therefore, the cooling water within the cooling tube 47 is replaced by new cooling water at intervals of 5 minutes. The double-structure particles 6 collected to the disk 46 can be viewed by the naked eye after lapse of about 3 or 4 minutes after the start of the spraying of the liquid mixture 28.

FIGS. 8A, 8B to 12A and 12B show a mechanism of forming the double-structure particles 6 having zeolite core 2 formed of a single zeolite particle 7.

Figure 8A:
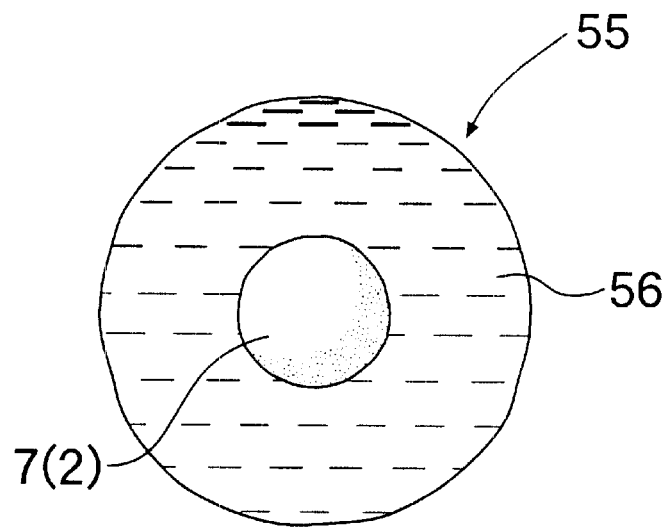
FIG. 8A is a sectional view of a liquid drop.
Figure 8B:
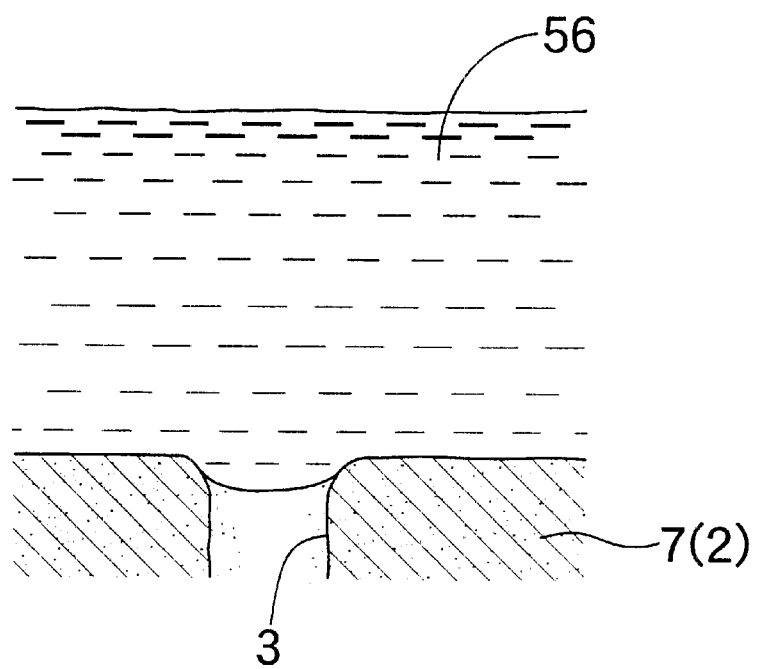
FIG. 8B is a partially enlarged view of the liquid drop shown in FIG. 8A.

FIGS. 8A and 8B show liquid drops 55 immediately after spraying of the liquid mixture 28 from the mini-mist nozzle 34. Each of the liquid drops comprises a zeolite particle 7, and a ceramic coat-forming aqueous precursor solution 56 spheroidized to wrap the zeolite particle 7.

Figure 9A:
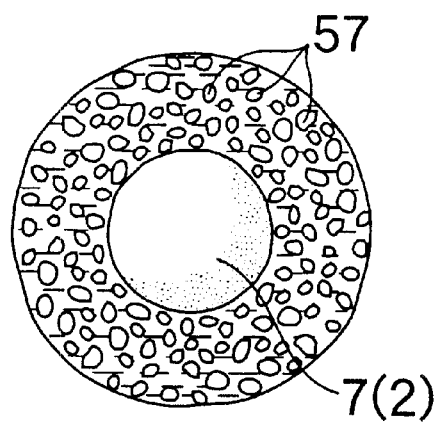
FIG. 9A is a sectional view of a liquid drop which is in course of drying.
Figure 9B:
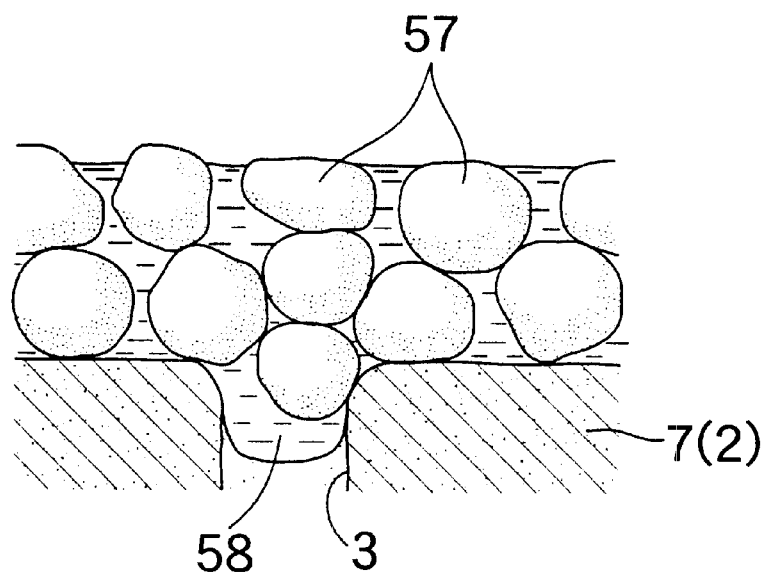
FIG. 9B is a partially enlarged view of the liquid drop shown in FIG. 9A.

At the stage shown in FIGS. 9A and 9B, the evaporation of moisture in the ceramic coat-forming aqueous precursor solution 56, namely, the drying of the liquid drops is advanced, whereby a plurality of precursor crystals 57 are precipitated and at the same time, the moisture and/or vapor 58 within the pore 3 in the zeolite particle 7 is trapped by the crystals 57.

Figure 10A:
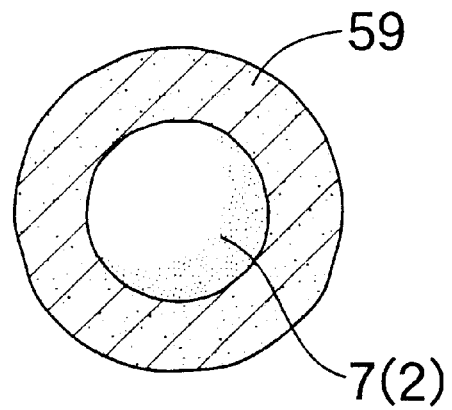
FIG. 10A is a sectional view of a particle having a ceramic layer.
Figure 10B:
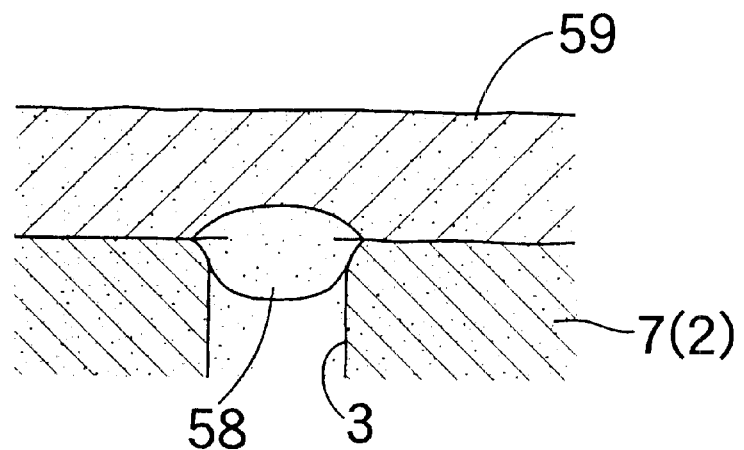
FIG. 10B is an enlarged view of the particle shown in FIG. 10A.

At the stage shown in FIGS. 10A and 10B, a ceramic layer 59 containing the moisture is produced by the pyrolysis and oxidation of the precursor crystals. The moisture trapped is converted into vapor 58, and such vapor and the trapped vapor are expanded.

Figure 11A:
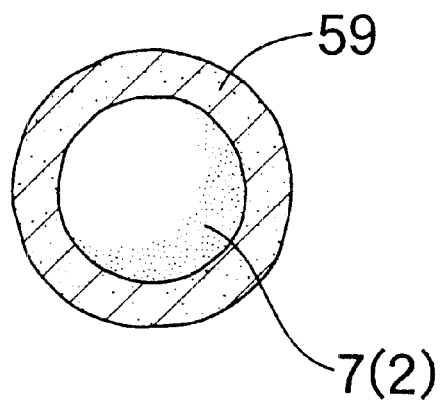
FIG. 11A is a sectional view of a particle having a densified ceramic layer.
Figure 11B:
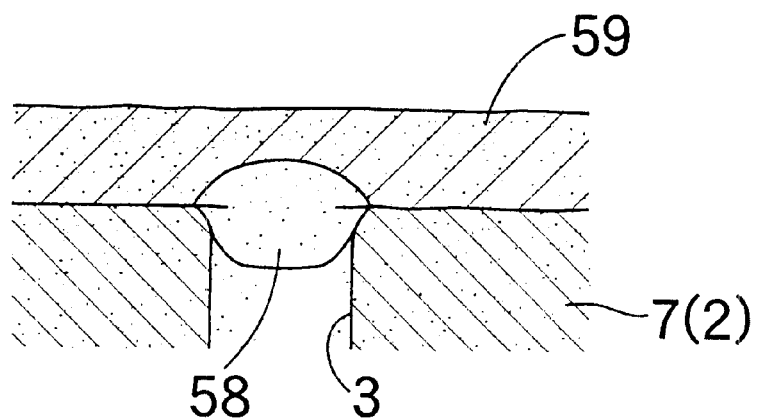
FIG. 11B is a partially enlarged view of the particle shown in FIG. 11A.

At the stage shown in FIGS. 11A and 11B, the drying of the ceramic layer 59 and the subsequent densification are advanced, and the expansion of the vapor is further increased.

Figure 12A:
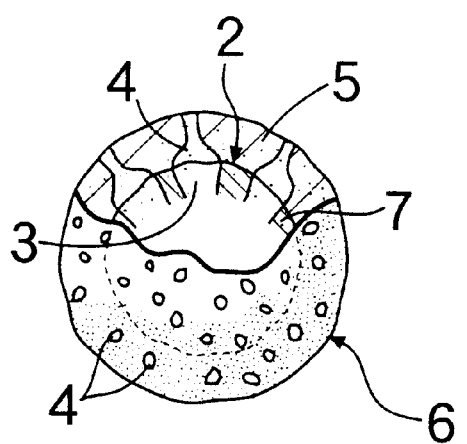
FIG. 12A is a sectional view of an essential portion of a double-structure particle.
Figure 12B:
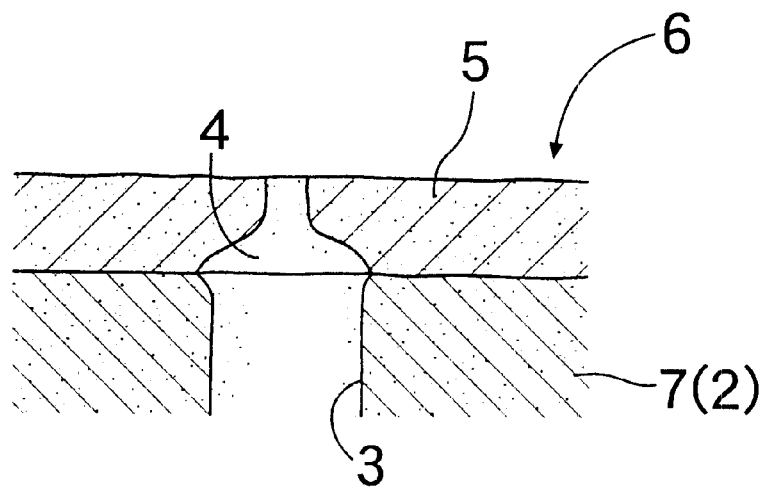
FIG. 12B is a partially enlarged view of the particle shown in FIG. 12A.

At the stage shown in FIGS. 12A and 12B, the trapped vapor is further expanded to escape through the ceramic layer 59 which has been completely not dried. Therefore, a plurality of through-pores 4 are defined in the ceramic layer 59 and thus, a ceramic coat 5 is formed.

Even when each of the double-structure particles 6 includes the zeolite core 2 comprising the plurality of zeolite particles 7, the double-structure particles 6 is formed by a mechanism similar to that described above.

An HC adsorbent 1 was produced under the following conditions:

A mixture of 150.122 grams of a one-mole aqueous solution of a liquid mixture 28 ($Al(NO_3)_3 \cdot 9H_2O$) and 20.13 grams of an agglomerate of HZSM-5 particles 7 having a diameter d1 in a range of 1 $\mu m \leq d1 \leq 20$ $\mu m$; the size of the reservoir 29: an inside diameter of 152.4 and a depth of 304.8 mm; the electrically powered stirring device 32: a rotational speed of 1,550 rpm and Universal Electric Company, Model 18-567-1; the compressor 18: an amount of air supplied of 0.05 m³/sec; the drying system 24: Deltech Engineering, Model HB 120-6; a dew point of −40° C.; the front special filter: Deltech Engineering, Model 815; the rear special filter: Deltech Engineering, Model HB508; the pressure of air controlled by the pressure regulator 26: 280 kPa; the air rotameter 23: Matheson 605, an accuracy of ±3% and a flow rate of air of about 22 L/min; methane: 99.97% UHP grade; the methane rotameter 20: Matheson 604, a flow rate of methane of 6.5 L/min; a Fisher® blast burner 11: Fisher Scientific, the size of the ejection port 14: a width of 4.06 mm, a length of 88.9 mm; the mini-mist nozzle 34: McMaster-Carr, a diameter of the ejection port 36 of 0.33 mm, an amount of liquid mixture sprayed equal to about 4.8

L/hr, and a spraying angle of 80°; a centrifugal pump 41: Franklin Electric, Model 110307488, a horsepower of 246 W; the pipeline 40 made of PTFE: an outside diameter of 9.525 mm; the Swagelock® needle valves 42, 44 and 50: an outside diameter of 6.35 mm; the pipe 35: an outside diameter of 6.35 mm and a length of 55.88 cm; the disk 46: a diameter of 98.425 mm and a thickness of 1.45 mm; the cooling tube 47: an outside diameter of 6.35 mm; a temperature of the cooling water of 18.33° C.; the duct 52: an inside diameter of 15.247 cm; the hood 53: a length of 45.72 cm and width of 45.72 cm; and the blower 54: a flow rate of air of 0.21 m³/sec and Cincinnati Fan Explosion Proof Blower, Model LM-4.

Figure 13:
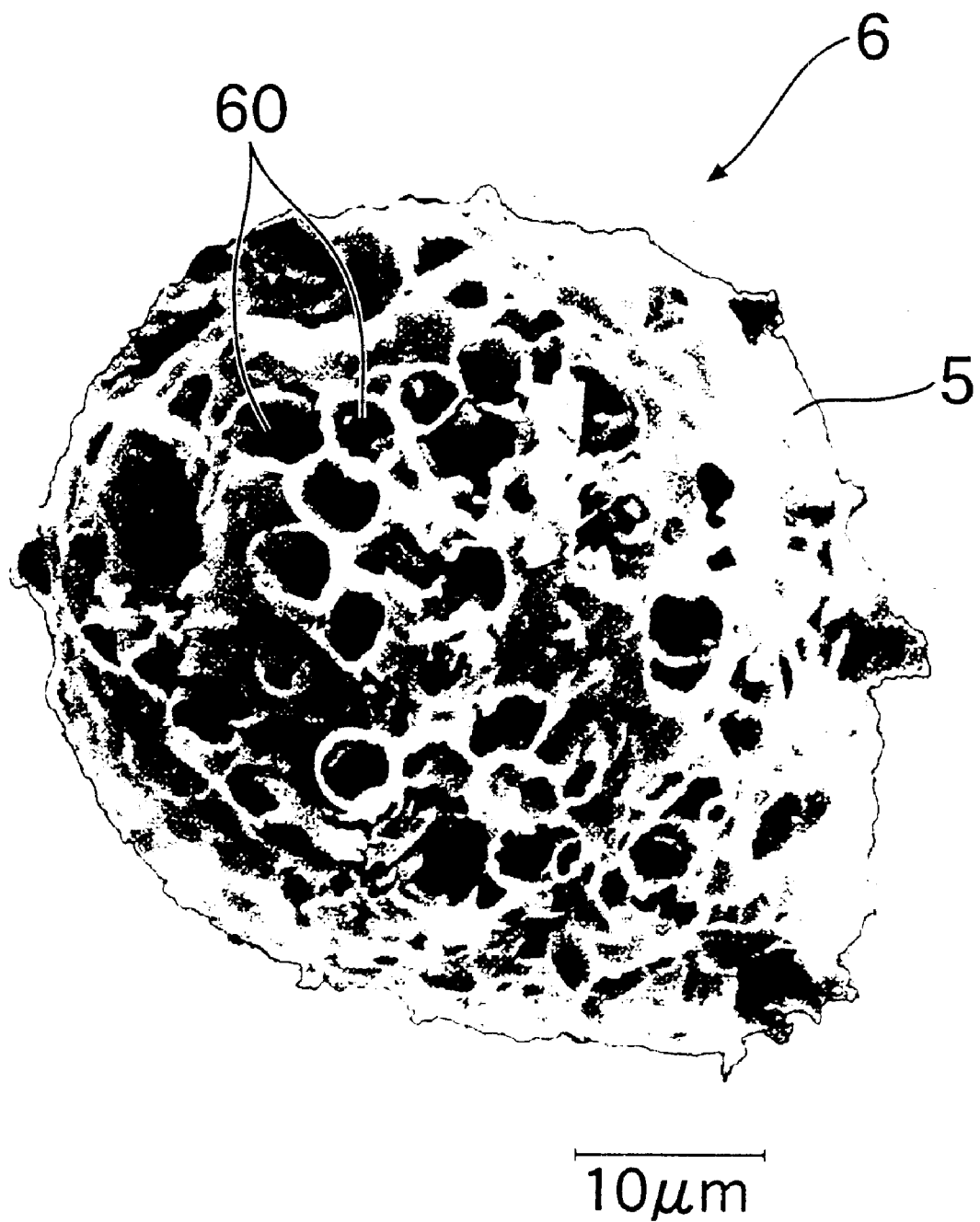
FIG. 13 is a perspective view of a double-structure particle.

FIG. 13 shows one double-structure particle 6 in the HC adsorbent 1 produced under the above-described conditions, and FIG. 13 is based on a photomicrograph. A ceramic coat 5 is formed on a surface, and if the outside diameter of the ceramic coat 5 and the diameter d1 (1 $\mu$m ≦ d1 ≦ 20 $\mu$m) of a HZSM-5 particle 7 are taken into consideration, it is considered that a plurality of HZSM-5 particles 7 exist inside the ceramic coat 5. The ceramic coat 5 has a plurality of craters 60 in its surface, and a through-pore 4 opens at a substantially center portion of each of the craters 60.

Figure 14:
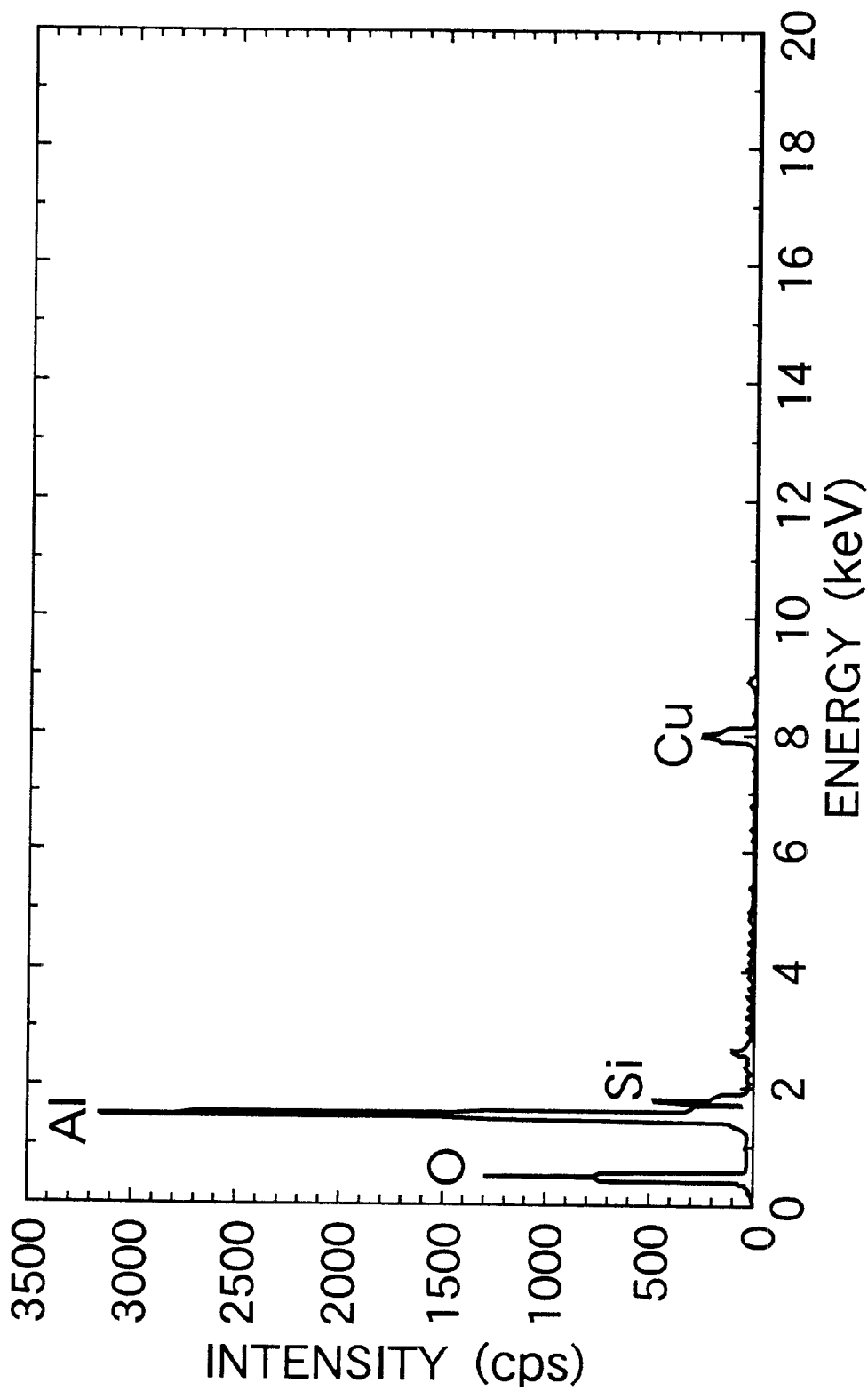
FIG. 14 is a chart showing a result of an Energy Dispersive X-ray Spectrometry (EDS or EDX) analysis for a ceramic coat.

FIG. 14 shows a result of an analysis carried out by EDS (Energy Dispersive X-ray Spectrometry) for the ceramic coat 5 formed of the double-structure particles 6. As can be seen from FIG. 14, a peak for aluminum was revealed at a site of about 1.5 KeV, and a peak for oxygen was revealed at a site of about 0.53 keV. From this, it was ascertained that the ceramic coat 5 was formed of $Al_2O_3$.

Figure 15:
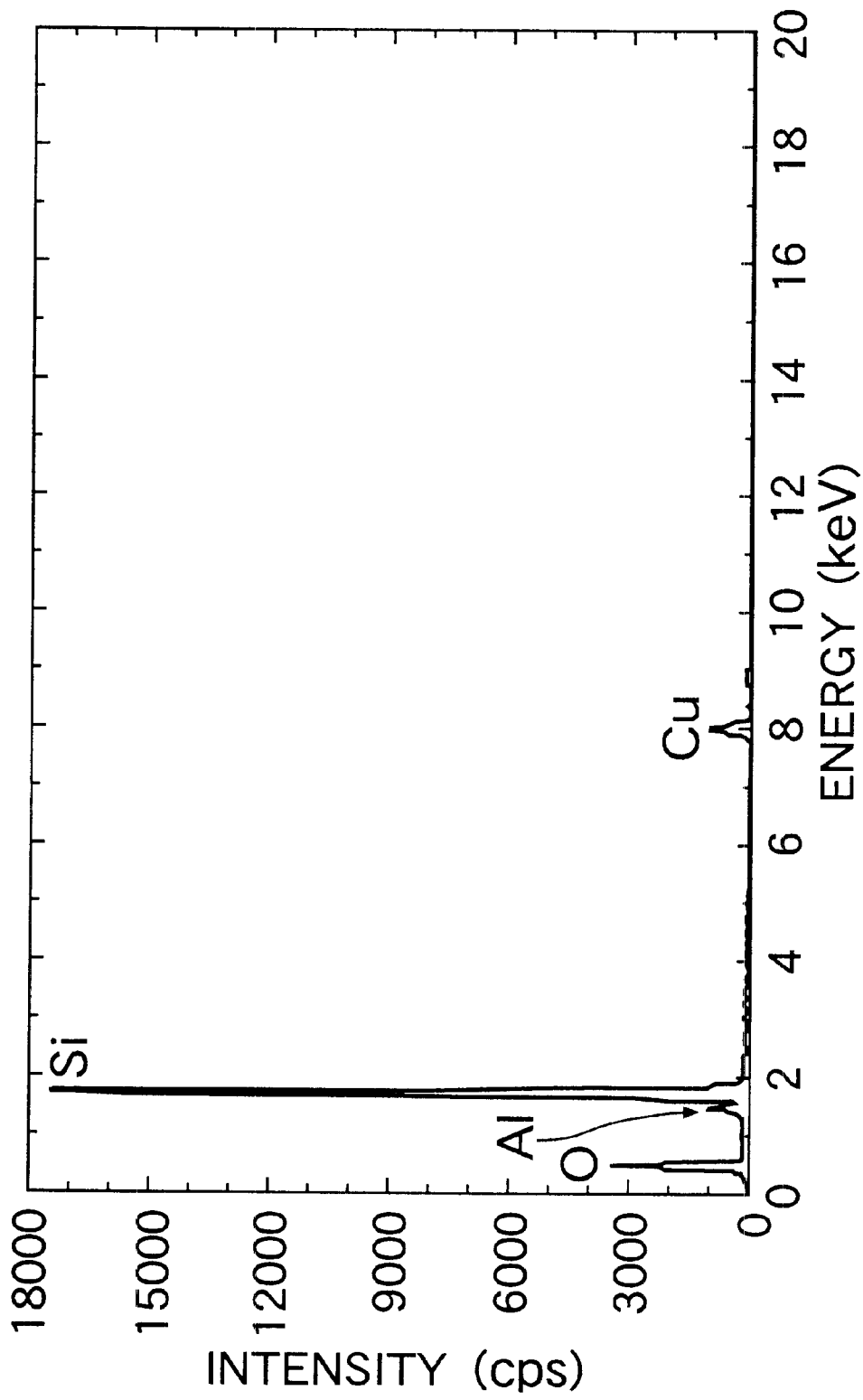
FIG. 15 is a chart showing a result of an EDS analysis for a zeolite core.

FIG. 15 shows a result of an analysis carried out by EDS for the zeolite core 2 formed of the double-structure particles 6 and thus for the HZSM-5 particles 7. It can be seen from FIG. 15 that a peak for silicon was revealed at a site of about 1.74 keV, and a peak for oxygen was revealed at a site of about 0.53 keV. The silicon and oxygen at these peaks formed $SiO_2$ (silicon dioxide) which is a main constituent for the HZSM-5 particle 7.

A peak for copper was revealed at a site of 8 keV in each of FIGS. 14 and 15, but this peak was disregarded, because such copper was produced from a copper grid on which a sample was placed.

Figure 16:
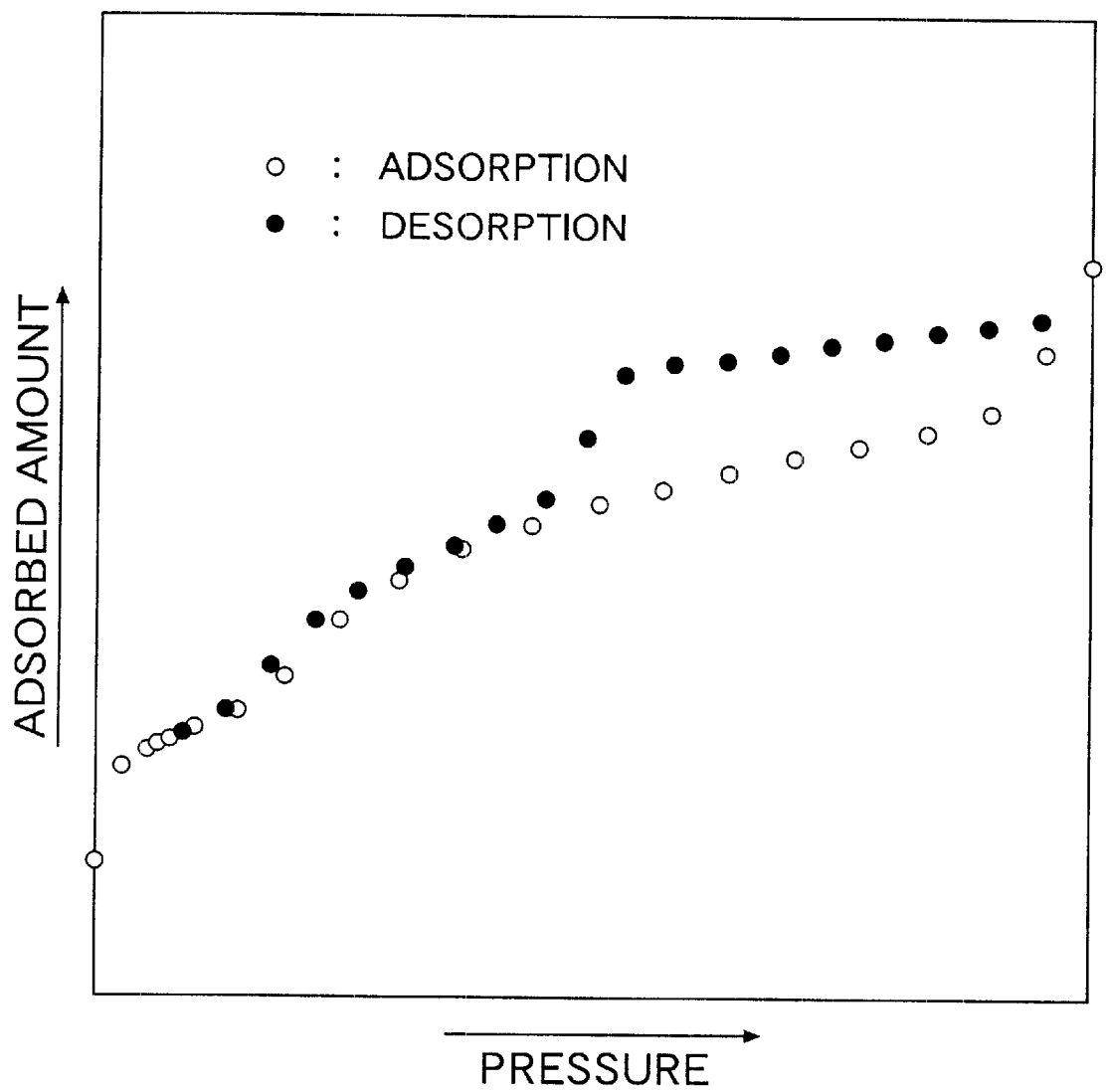
FIG. 16 is an adsorption isotherm diagram for the HC adsorbent.

An adsorption isotherm at 77K for the HC adsorbent 1 was determined by utilization of a nitrogen adsorption process (using Belsorp 36 made by Nippon Bell, Co., as an instrument), thereby providing a result shown in FIG. 16. A hysteresis was generated in FIG. 16 at the desorption of nitrogen, and it was ascertained from the type of this hysteresis that the through-pore 4 in the ceramic coat 5 was of such a shape that the nitrogen was difficult to flow through the through-pore, e.g., a bottle neck-shape in this example.

Then, a mixed gas comprising 1% by volume of pentene and 99% by volume of nitrogen was prepared as an adsorption gas in order to examine the characteristic of flow-out of the desorbed HC in the HC adsorbent 1. The HC adsorbent was subjected to a pretreatment for heating the adsorbent 1 in vacuum, and then transferred into a flow-through type test tube. Thereafter, the adsorption gas was allowed to flow at a flow rate of 90 ml/min through the flow-through type test tube for one hour, where the adsorption gas was adsorbed to the HC adsorbent 1. In this case, the amount of adsorption gas adsorbed to the HC adsorbent 1 was substantially equal to that in a saturated state.

For comparison, the adsorption gas was adsorbed to an agglomerate of HZSM-5 particles in the same manner as described above, except that the agglomerate of HZSM-5 particles was used.

The HC adsorbent 1 with the adsorption gas included therein was placed in a thermogravimetric measurement (TG)-gravimetric analysis (MS) device and then heated at a rate of temperature rise of 50° C./10 min. The desorbed 1-pentene was qualified by the gravimetric analysis (MS) at a point at which the change in weight occurred in the thermogravimetric (TG) analysis in order to examine the heating temperature and the situation of flowing-out of the 1-pentene, thereby providing a result indicated by a solid line in FIG. 17. A dashed line in FIG. 17 corresponds to the agglomerate of the HZSM-5 particles.

Figure 17:
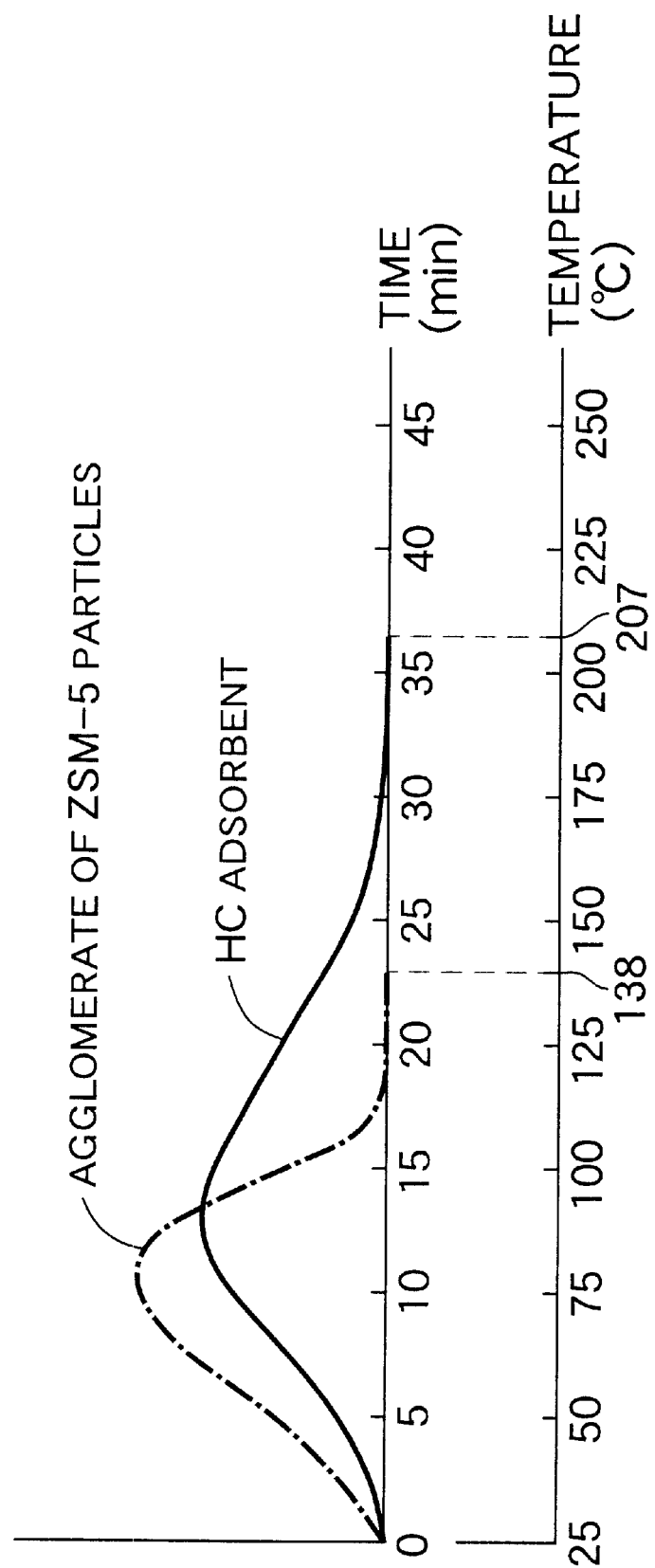
FIG. 17 is a graph showing the situation of flowing-out of 1-pentene from the HC adsorbent.

As apparent from FIG. 17, the situation of flowing-out of the desorbed 1-pentene is as follows: The flowing-out of the desorbed 1-pentene in the case of the HC adsorbent 1 is slower than that in the case of the agglomerate of the HZSM-5 particles, and the temperature at the end of the flowing-out of the pentene is about 207° C. in the case of the HC adsorbent 1, which is about 69° C. higher than that of about 138° C. in the case of the agglomerate of the HZSM-5 particles. This increase in the temperature at the end of the flowing-out of the pentene is attributable to the presence of the ceramic coat 5.

Table 1 shows the relationship between the type of the liquid mixture 28 as well as the concentration of the precursor and the amount of liquid mixture sprayed from the spray port 36 in the mini-mist nozzle 34. In the column of the sprayed amount in Table 1, "S" (which represents "Small") indicates about 4.8 L/hr; "M" (which represents "Medium") indicates about 7.2 L/hr, and "L" (which represents "Large") indicates about 9.6 L/hr. "○" in Table 1 means that the combination of the liquid mixture 28 and the mini-mist nozzle 33 is suitable.

TABLE 1

| | Spray port in mini-mist nozzle | | | | | | | | | | | |
|---|---|---|---|---|---|---|---|---|---|---|---|---|
| | Sprayed amount | | | Sprayed amount | | | Sprayed amount | | | Sprayed amount | | |
| Type of liquid mixture | S | M | L | S | M | L | S | M | L | S | M | L |
| $Si(OC_2H_5)_4$ + $H_2O$ | ○ | ○ | ○ | | ○ | | | ○ | | ○ | ○ | ○ |
| $Al(NO_3)_3$ + $H_2O$ | ○ | ○ | ○ | | ○ | | | ○ | | ○ | ○ | ○ |
| $Y(NO3)3$ + $H_2O$ | ○ | | | | ○ | | | ○ | | ○ | ○ | ○ |
| Concentration of precursor | 0.5 mol | | | 1.0 mol | | | 2.0 mol | | | 3.0 mol | | |

[II] Spray Pyrolysis Method

An aerosol is used as a starting material in this method. The aerosol is at least one of an agglomerate of a plurality of liquid drops each comprising a single zeolite particle wrapped by a precursor solution, and an agglomerate of a plurality of liquid drops each comprising a plurality of zeolite particles wrapped by a precursor solution, namely, aerosol mists dispersed in the open air. Ethyl alcohol, methyl alcohol and the like may be used as a solvent for the precursor. An inert gas such as nitrogen, argon, helium and the like may be used as a carrier gas for the aerosol mists.

The HC adsorbent 1 is produced using a horizontal aerosol reactor or a vertical aerosol reactor.

Figure 18:
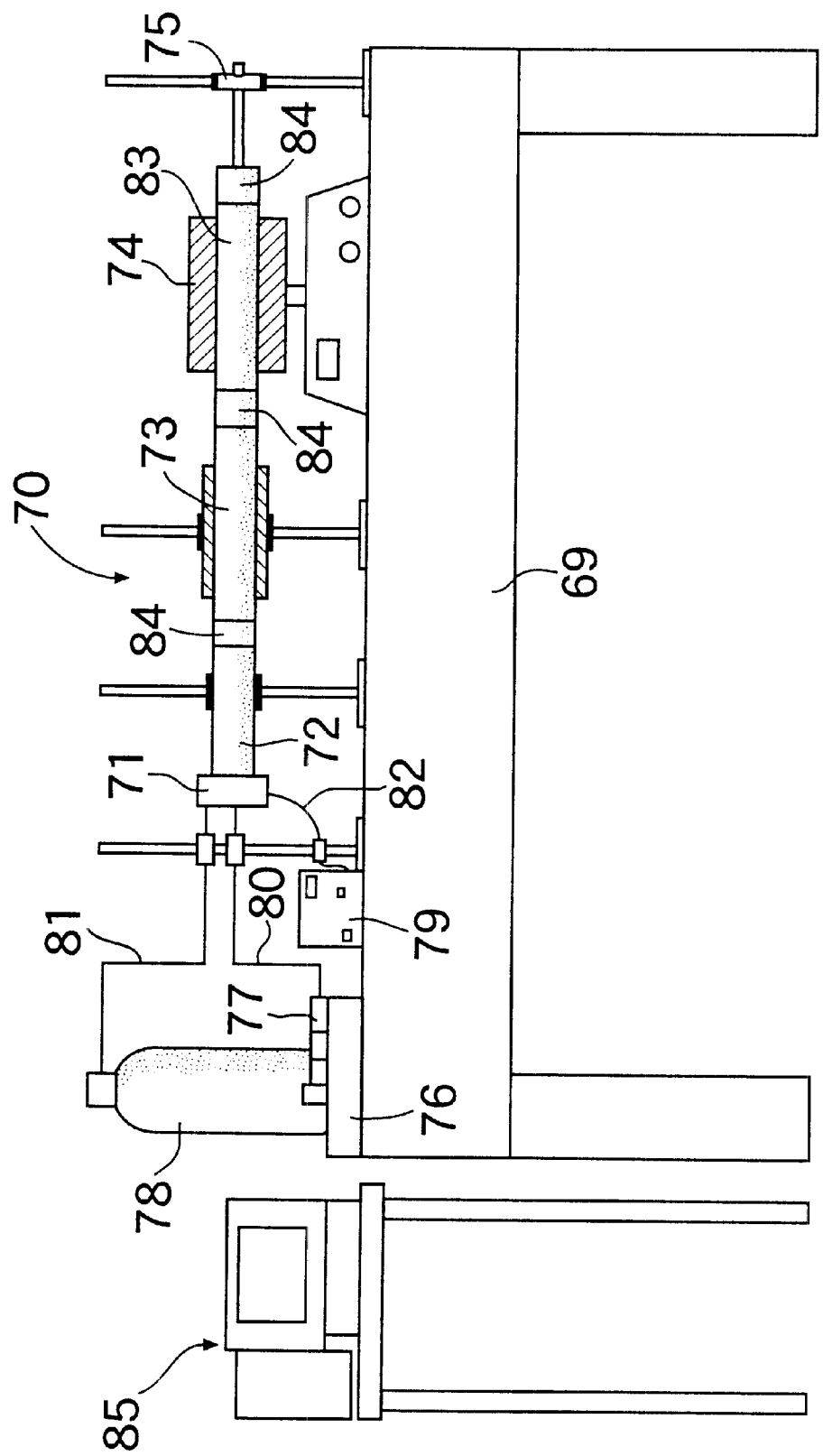
FIG. 18 is a front view of a horizontal aerosol reactor.

(A) FIG. 18 shows a horizontal aerosol reactor 70. The reactor 70 includes a base 69. A ultrasonic nozzle device (ultrasonic nozzle) 71, a chamber (flexible glass chamber) 72 made of a Flexible Glass (name of trademark), a preheater (a glass preheater) 73 made of a glass, a burning/heating furnace (a single-zone furnace) 74 and a filter device (a filter assembly) 75 are disposed on an upper surface of the base 69 in the named order sequentially from one end toward the other end of the base 69. Disposed in the vicinity of the ultrasonic nozzle device 71 are a reservoir 76 into which a mixture comprising an agglomerate of zeolite particles 7 and a ceramic coat-forming precursor solution is placed, a tubular pump 77 mounted on the reservoir 76, a nitrogen tank 78, and a power supply 79. A discharge port in the tubular pump 77 and the nitrogen tank 78 are connected to the ultrasonic nozzle device 71 through conduits 80 and 81, and the power supply 79 is connected to the ultrasonic nozzle device 71 through an electric wire 82.

The ultrasonic nozzle device 71 is used to eject the precursor solution to nebulize the latter in order to generate aerosol mists. In order to provide an amplification of an input signal and an increase in amplitude on the nebulized surface in the ultrasonic nozzle device 71, an electric energy is converted into a mechanical energy by use of a pair of disk-type piezoelectric transducer sandwiched between two cylinders made of titanium. If an ultrasonic energy exceeds an energy provided by the surface tension of the solution, the nebulization of the solution occurs. A vibration frequency is a parameter for controlling the size distribution of the liquid particles.

A nozzle included in the ultrasonic nozzle device 71 is surrounded by a plurality of bores for permitting nitrogen as a carrier gas to flow therethrough, and disposed centrally in an inlet in the chamber 72. A pressure gauge and a pressure release valve are incorporated in the chamber 72.

A tube 83 made of mullite is disposed within the burning and heating furnace 74, so that a decomposing reaction of the ceramic coat-forming precursor is effected within the tube 83. The chamber 72 and the preheater 73 are connected to each other by a specially designed connector 84; the preheater 73 and the burning and heating furnace 74 are also connected to each other by the connector 84 and further, the burning and heating furnace 74 and the filter device 75 are connected to each other by the connector 84. Thus, the loss of the aerosol mists due to the condensation and solidification can be minimized. The filter device 75 includes a membrane filter having micro-pores made by etching in order to collect synthesized double-structure particles. For the purpose of maintaining the inside of the filter device 75 in a highly depressurized state, a vacuum pump (not shown) is connected to the filter device 75. Thus, it is possible to continue the producing operation over a long period. In any other method, it is impossible to maintain the depressurized state due to the clogging of the filter with the double-structure particles.

Thermocouples (not shown) are disposed at various locations in the reactor 70, so that a temperature measured by each of the thermocouples is recorded directly in a computer in a data acquisition system 85.

The HC adsorbent 1 is produced using the aerosol reactor 70 via a course, which will be described below.

The liquid mixture comprising the agglomerate of the zeolite particles 7 and the ceramic coat-forming precursor solution is placed into the reservoir 6.

The tubular pump 77 is operated to supply the liquid mixture into the ultrasonic nozzle device 71, and the precursor solution in the liquid mixture is ejected and nebulized by the ultrasonic nozzle device 71, whereby an agglomerate of a plurality of liquid drops each comprising a single (or two or more) zeolite particles 7 wrapped by the precursor solution, namely, aerosol mists. Then, the aerosol mists are injected into the chamber 72.

The aerosol mists are transferred toward the preheater 73, while passing the nitrogen through the plurality of bores surrounding the nozzle of the ultrasonic nozzle device 71 and injecting the nitrogen into the chamber 72 to form a shroud around each of the aerosol mists.

The aerosol mists and the nitrogen flow into the mullite tube 83 of the burning and heating furnace 74, where the decomposing reaction of the precursor is conducted, and the formation of a ceramic coat 5 wrapping the zeolite core 2 is conducted.

Double-structure particles 6 synthesized in the above manner are collected by the filtration under a reduced pressure in the filter device 75, and the nitrogen is discharged out of the filter device 75.

In the mechanism of forming the above-described double-structure particles 6, the state shown in FIGS. 8A and 8B appears in the chamber 72; the state shown in FIGS. 9A and 9B appears in the preheater 73; and the states shown in FIGS. 10A, 10B to 12A and 12B appear in the burning and heating furnace 74.

The HC adsorbent 1 was produced under following conditions: The liquid mixture: a mixture of 1000 grams of a 1-mol aqueous solution of $Si(OC_2H_5)_4$ and 20 grams of an agglomerate of HZSM-5 particles having a diameter d1 in a range of $1\ \mu m \leq d1 \leq 8\ \mu m$; the ultrasonic nozzle device 71: Model 8700-6 OMS, Sono-Tek, Highland, N.Y.), a nominal operation frequency of 60 kHz; The tubular pump 77: Compact Infusion Pump, Harvard Apparatus, Model 975, a capacity of 100 $cm^3$ and a flow rate of 1.5 $cm^3$/min (changeable in a range of 0.0048 to 77 $cm^3$/min); the chamber 72: a length of 15.24 cm and a diameter of 5.08 cm; the preheater 73: a diameter of 5.08 cm, a length of 45.72 cm and a temperature of 150° C.; the burning and heating furnace 74: Thermolyne, Model F21125, Dubuque, Iowa, a length of range heating by the mullite tube 83 equal to 30.5 cm, a temperature of 700–750° C. (a highest temperature of 1,100° C.); and the filter of the filter device 75: Millipore Corp., Bedford, Mass., a diameter of 25 mm and a pore diameter of 0.2 $\mu m$.

One of the double-structure particles 6 in the HC adsorbent produced under the above-described conditions had a structure substantially similar to that of a particle shown in FIG. 13.

Figure 19:
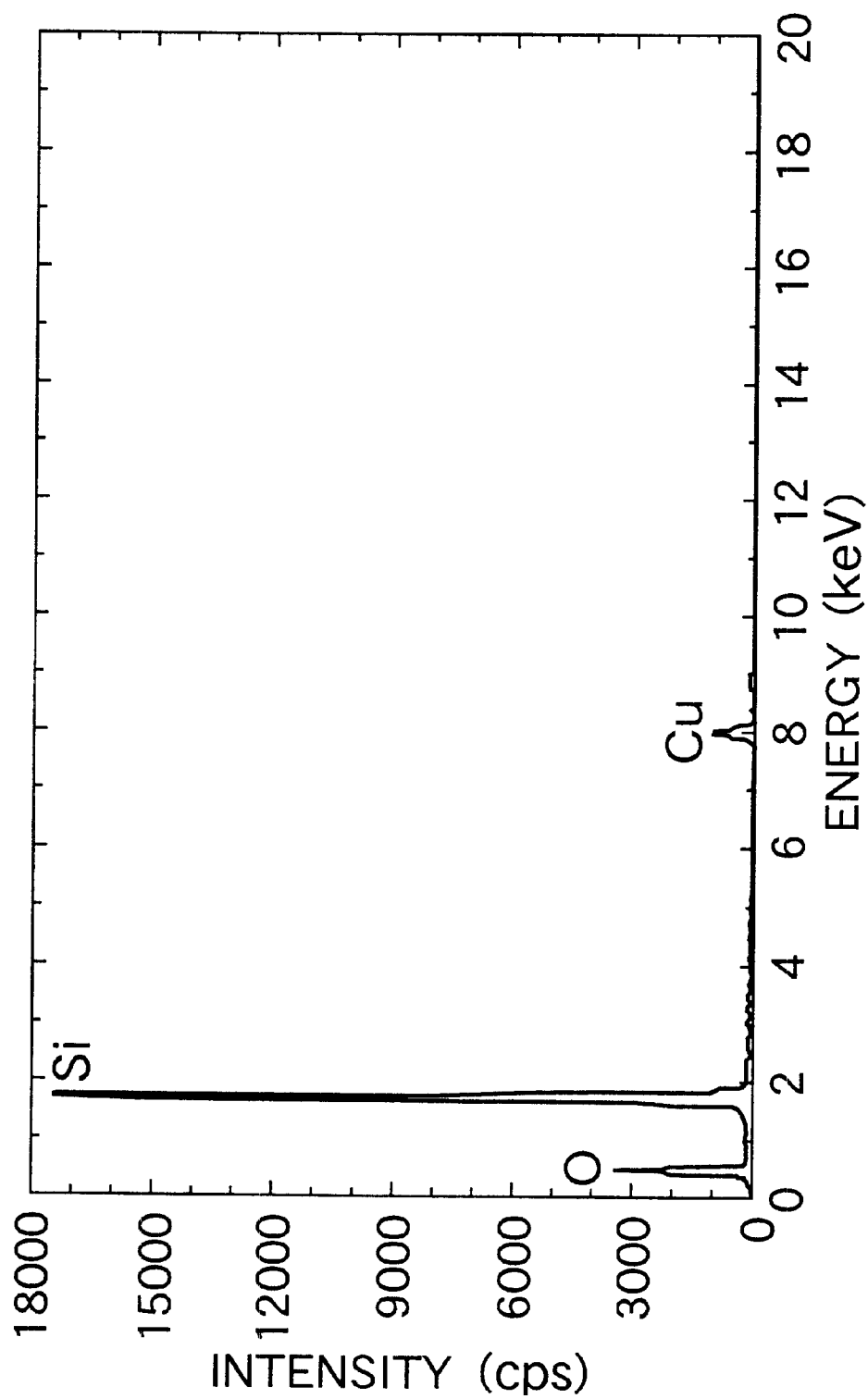
FIG. 19 is a chart showing a result of an EDS analysis for a ceramic coat.

FIG. 19 shows a result of an analysis conducted by EDS for the ceramic coat 5 of the double-structure particles 6. As apparent from FIG. 19, a peak for silicon was revealed at a site of about 1.74 keV, and a peak for oxygen was revealed at a site of about 0.53 keV. From this, it was ascertained that the ceramic coat 5 was formed of $SiO_2$ (silicon dioxide). With regard to the zeolite core 2, a result substantially similar to that shown in FIG. 15 was obtained.

In FIG. 19, a peak for copper was revealed at a site of 8 keV, but this peak is disregarded, because such copper was produced from a copper grid on which a sample was placed.

Figure 20:
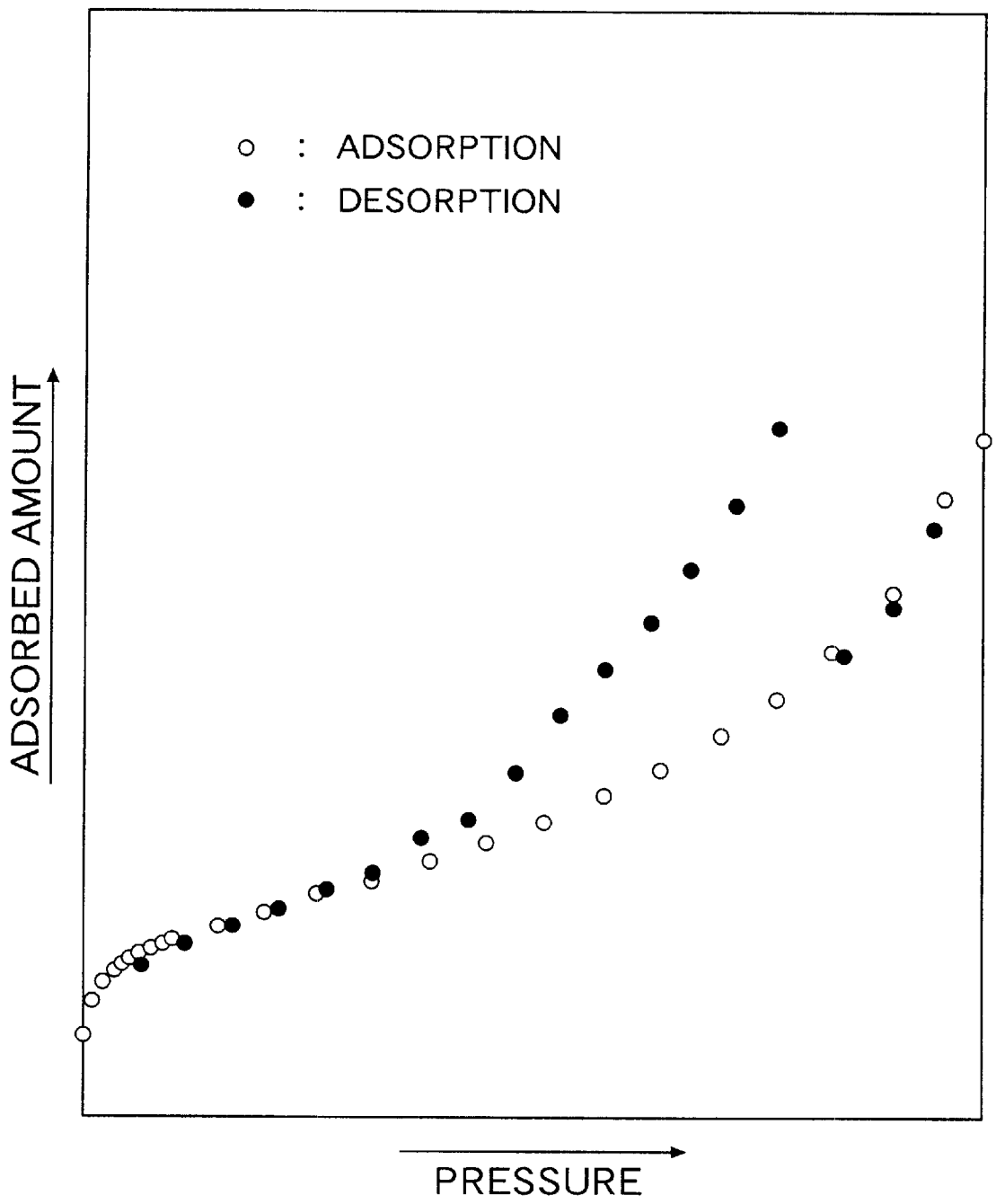
FIG. 20 is an adsorption isotherm diagram for an HC adsorbent.

Then, an adsorption isotherm at 77K for the HC adsorbent 1 was likewise determined by utilization of a nitrogen adsorption process (using Belsorp 36 made by BEL JAPAN, INC., as an instrument), whereby a result shown in FIG. 20 was obtained. A hysteresis was generated in FIG. 20 at the desorption of nitrogen, and it was ascertained from the type of this hysteresis that the through-pore 4 in the ceramic coat 5 was of such a shape that the nitrogen was difficult to flow through the through-pore, e.g., a bottle neck-shape in this example.

Then, a mixed gas comprising 1% by volume of pentene and 99% by volume of nitrogen was prepared as an adsorption gas in order to examine the characteristic of flow-out of the desorbed HC in the HC adsorbent 1. The HC adsorbent was subjected to a pretreatment for heating the adsorbent 1 in vacuum, and then transferred into a flow-through type test tube. Thereafter, the adsorption gas was allowed to flow at a flow rate of 90 ml/min through the flow-through type test tube for one hour, where the adsorption gas was adsorbed to the HC adsorbent 1. In this case, the amount of adsorption gas adsorbed to the HC adsorbent 1 was substantially equal to that in a saturated state.

The HC adsorbent 1 including the adsorption gas therein was placed in a thermogravimetric (TG)-gravimetric analysis (MS) device and then heated at a rate of temperature rise of 50° C./10 min. The desorbed 1-pentene was qualified by the gravimetric analysis (MS) at a point at which the change in weight occurred in the thermogravimetric (TG) analysis in order to examine the heating temperature and the situation of flowing-out of the 1-pentene, whereby a result indicated by a solid line in FIG. 21 was obtained. A dashed line in FIG. 21 corresponds to the agglomerate of the HZSM-5 particles, as in FIG. 17.

Figure 21:
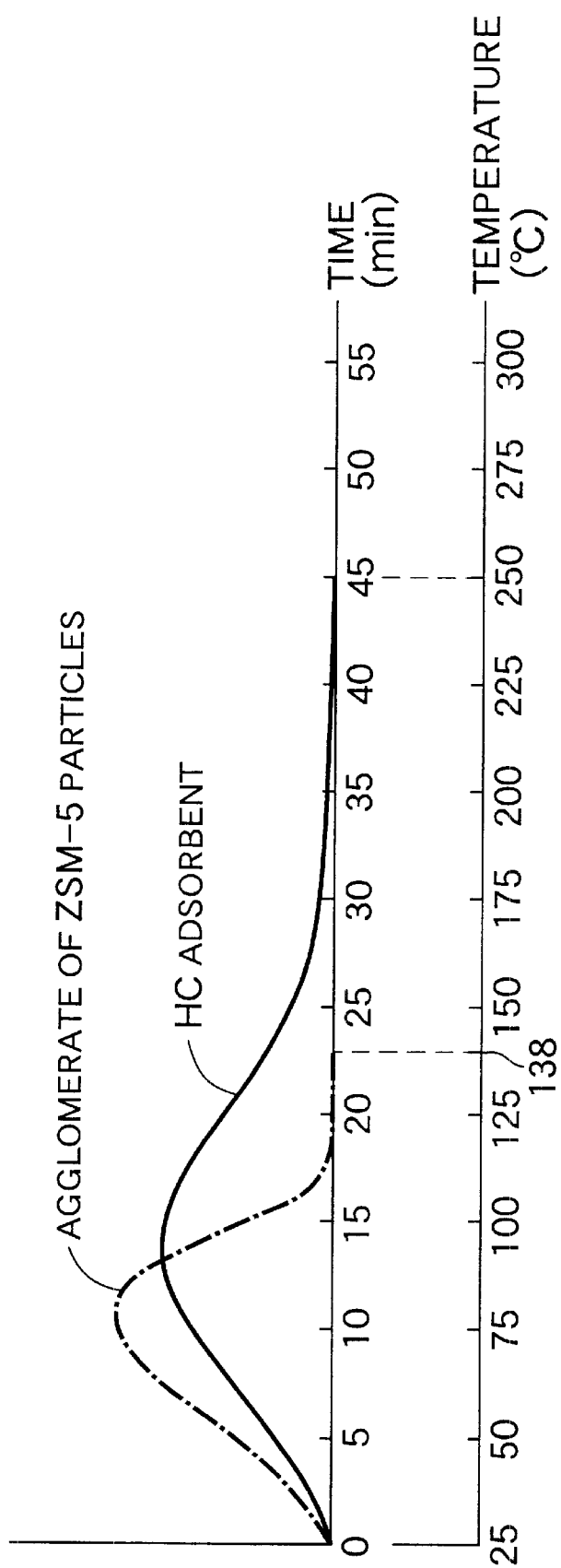
FIG. 21 is a graph showing the situation of flowing-out of 1-pentene from the HC adsorbent.

As apparent from FIG. 21, the situation of flowing-out of the desorbed 1-pentene is as follows: The flowing-out of the desorbed 1-pentene in the case of the HC adsorbent 1 is slower than that in the case of the agglomerate of the HZSM-5 particles, and the temperature at the end of the flowing-out of the 1-pentene is about 250° C. in the case of the HC adsorbent 1, which is about 112° C. higher than that of about 138° C. in the case of the agglomerate of the HZSM-5 particles. This increase in the temperature at the end of the flowing-out of the pentene is attributable to the presence of the ceramic coat 5.

It is possible to produce doped double-structure particles by a method similar to that described above, using an aqueous precursor solution.

Figure 22:
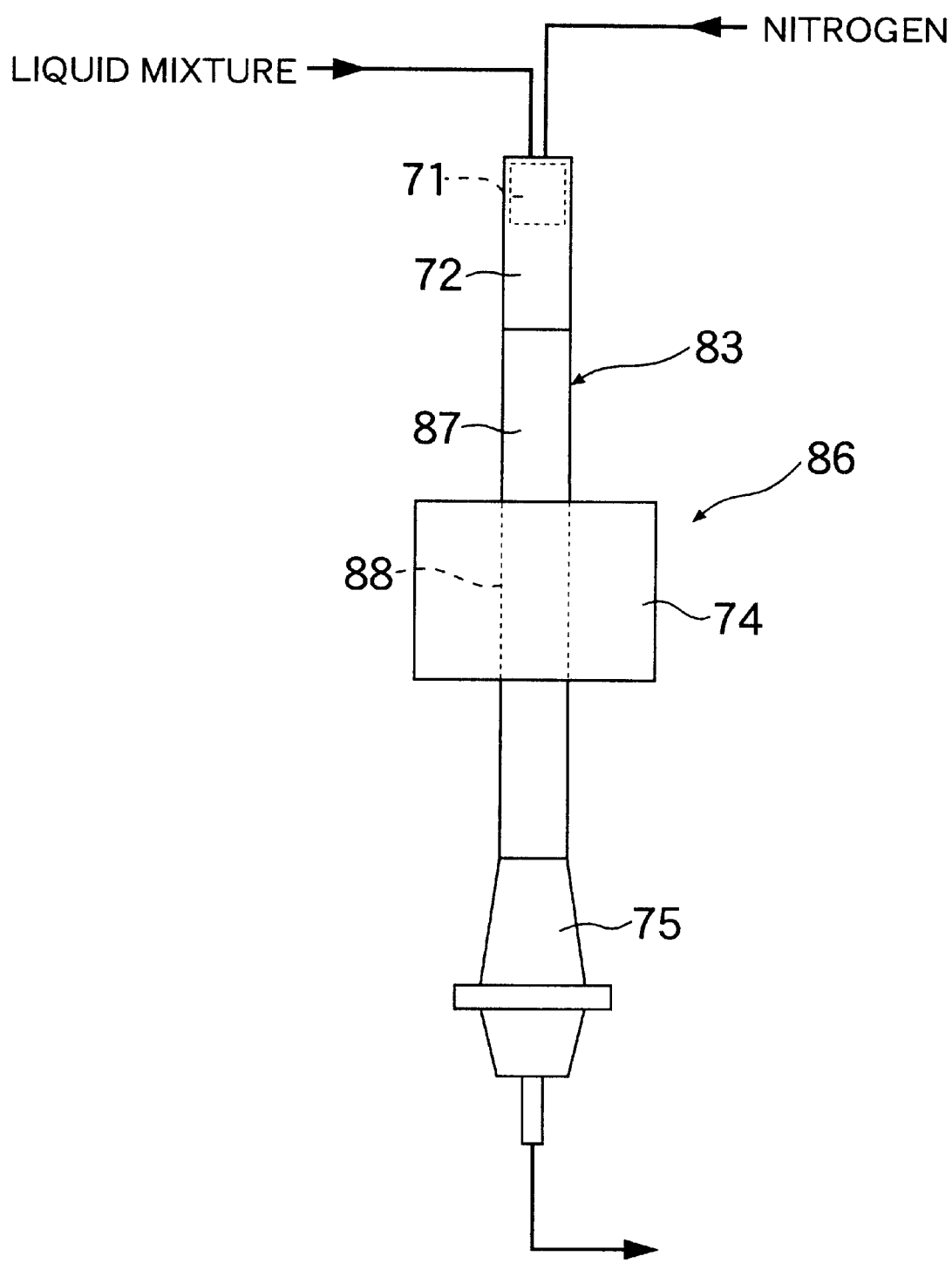
FIG. 22 is a front view of a vertical aerosol reactor.

(B) FIG. 22 shows a vertical aerosol reactor 86. The ultrasonic nozzle device 71 is mounted within the chamber 72 placed vertically. The aerosol mists and nitrogen (a carrier gas) flow downwards toward the burning and heating furnace 74. The liquid mixture is continuously supplied to the ultrasonic nozzle device 71 by a rotary pump. Unlike the horizontal aerosol reactor, an independent preheater is not used in the vertical aerosol reactor. A mullite tube 83 having a length of 609.6 mm is used as a preheater and a synthetic tube (a process tube). One (304.8 mm) of halves of the tube 83 is located outside the burning and heating furnace 74, and a heating tape is wound around the half of the tube 83, so that the temperature is controlled to 175° C. The other half of the tube 83 is located within the burning and heating furnace (Thermolyne, Model F21125, Dubuque, Iowa) 74, so that temperature is maintained at about 700° C. used in the furnace 74. The furnace 74 has a heating zone having a length of 304.8 mm, and the temperature in the furnace 74 can be raised up to 1,200° C. The double-structure particles 6 are collected by a filter device 75 similar to the filter device described above in the horizontal aerosol reactor. In the vertical aerosol reactor, the rate of collection of the particles was about 65%, and this numerical value was determined by an amount of particles collected by the filter. The remaining particles were deposited on a wall of the burning and heating furnace 74.

To collect a large number of double-structure particles, a filter having a larger diameter (>25 mm) is used in the filter device 75.

Table 2 shows the relationship between the type and concentration of the precursor and the type of a solvent for the precursor.

TABLE 2

| Type of precursor | Type of solvent for precursor | | | | | | | | | | | |
|---|---|---|---|---|---|---|---|---|---|---|---|---|
| | 1 | 2 | 3 | 1 | 2 | 3 | 1 | 2 | 3 | 1 | 2 | 3 |
| Si(OC$_2$H$_5$)$_4$ | ○ | | | ○ | | | ○ | | | ○ | | |
| | | | | | ○ | ○ | ○ | ○ | | | ○ | |
| | | | | | | | | | ○ | ○ | ○ | ○ |
| Al(NO$_3$)$_3$ | ○ | | | ○ | | | ○ | | | ○ | | |
| | | | | | ○ | ○ | ○ | ○ | | | ○ | |
| | | | | | | | | | ○ | ○ | ○ | ○ |
| Y(NO$_3$)$_3$ | ○ | | | ○ | | | ○ | | | ○ | | |
| | | | | | ○ | ○ | ○ | | | | ○ | |
| | | | | | | | | | ○ | ○ | ○ | ○ |
| Concentration of precursor | 0.5 mol | | | 1.0 mol | | | 2.0 mol | | | 3.0 mol | | |

1: H$_2$O
2: CH$_3$OH
3: C$_2$H$_5$OH

The mark "○" put in the column of H$_2$O in Table 2 at a concentration of, for example, Si(OC$_2$H$_5$)$_4$ equal to 0.5 mol, means that H$_2$O is suitable as a solvent. In addition, the mark "○" put in the column of H$_2$O and in the columns of H$_2$O and CH$_3$OH in Table 2 at a concentration of Si(OC$_2$H$_5$)$_4$ equal to 1.0 mol, means that not only H$_2$O but also a mixture of H$_2$O and CH$_3$OH are suitable as a solvent.

What is claimed is:

1. An adsorbent for hydrocarbons (HC) in an exhaust gas, comprising an agglomerate of double-structure particles, each of which includes an HC-adsorbing zeolite core, and a ceramic coat wrapping said zeolite core and having a plurality of through-pores communicating with a plurality of pores in said zeolite core, wherein each of said double-structure particles is at least one of a double-structure particle including said zeolite core comprising a single zeolite particle, and a double-structure particle including said zeolite core comprising a plurality of zeolite particles, and each of said plurality of through-pores in said ceramic coat has such a bottleneck shape with an opening narrowed down that the HC is easy to flow into said through-pore and difficult to flow out of said through-pore.

2. An adsorbent for hydrocarbons (HC) in an exhaust gas according to claim 1, wherein said zeolite particle has a diameter d1 in a range of 5 μm≦d1≦20 μm.

3. An adsorbent for hydrocarbons (HC) in an exhaust gas according to claim 1, wherein said zeolite particle is at least one selected from the group consisting of a ferrierite particle, a ZSM-5 particle, a Y-type particle, a mordenite particle and a β-type particle.

4. An adsorbent for hydrocarbons (HC) in an exhaust gas according to claim 1, wherein the average diameter d2 of openings in said through-pores in said ceramic coat is in a range of 0.2 nm≦d2≦0.8 nm.

5. An adsorbent for hydrocarbons (HC) in an exhaust gas according to claim 1, wherein said ceramic coat is formed of at least one compound selected from the group consisting of Al$_2$O$_3$, SiO$_2$, and Y$_2$O$_3$.

6. A process for producing an adsorbent for hydrocarbons (HC) in an exhaust gas, said adsorbent comprising an agglomerate of double-structure particles, each of which includes an HC-adsorbing zeolite core, and a ceramic coat wrapping said zeolite core and having a plurality of through-pores, each said through-pore being of a bottleneck shape with an opening narrowed down so that the HC is easy to flow into said through-pore and difficult to flow out of said through-pore, said process comprising the steps of:

preparing a liquid mixture of an agglomerate of zeolite particles and a ceramic coat-forming precursor solution; and spraying said liquid mixture into a cylindrical flame and flying the mixture within said cylindrical flame; and during the flying of the mixture, carrying out the following steps in the mentioned order:

forming at least one of a plurality of liquid drops each comprising a single of said zeolite particle wrapped with said precursor solution and a plurality of liquid drops each comprising a plurality of said zeolite particles wrapped with said precursor solution, precipitating said precursor by drying said liquid drops, and trapping at least one of a liquid and vapor into pores in said zeolite particles, forming a ceramic layer by pyrolysis of said precursor, and creating said through-pores by escaping of the trapped vapor through said ceramic layer.

\* \* \* \* \*